Figure 1:
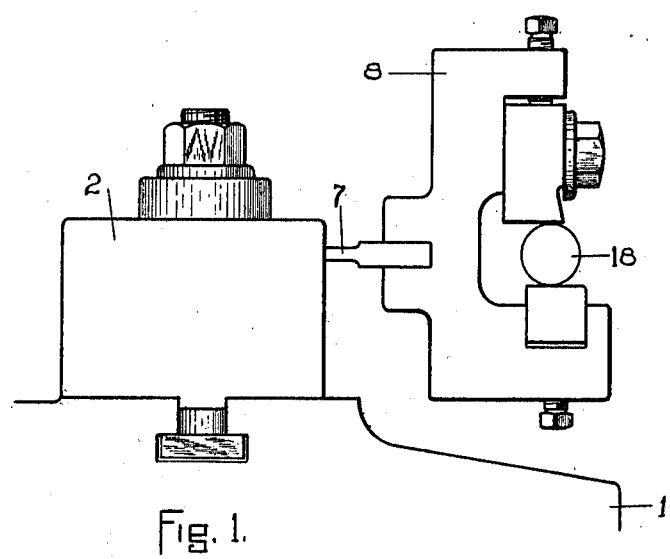

G. H. NEWTON.
METAL TURNING TOOL.
APPLICATION FILED APR. 21, 1909.

993,615.

Patented May 30, 1911.

WITNESSES.
J. H. Thurston
C. G. Bradley.

INVENTOR.
George H. Newton,
By Wilmarth H. Thurston,
Attorney.

UNITED STATES PATENT OFFICE.

GEORGE H. NEWTON, OF PROVIDENCE, RHODE ISLAND, ASSIGNOR TO BROWN & SHARPE MANUFACTURING COMPANY, OF PROVIDENCE, RHODE ISLAND, A CORPORATION OF RHODE ISLAND.

METAL-TURNING TOOL.

993,615.      Specification of Letters Patent.     Patented May 30, 1911.

Application filed April 21, 1909. Serial No. 491,219.

*To all whom it may concern:*

Be it known that I, GEORGE H. NEWTON, of the city and county of Providence and State of Rhode Island, have invented certain new and useful Improvements in Metal-Turning Tools; and I do hereby declare the following specification, taken in connection with the accompanying drawings, forming a part of the same, to be a full, clear, and exact description thereof.

The present invention relates more particularly to that class of metal turning tools known as sizing tools which are employed for turning or reducing a rod of stock or other work to a given and definite size or diameter.

The object of the invention is to provide a tool of this character which will not only serve to thus turn or reduce the work to a given and uniform diameter, but which will also be self-adjusting with relation to the work, and so that when the tool is mounted in a metal working machine, and is brought into contact with the work, said tool will, if the work should not happen to be in proper alinement, automatically adjust its position with relation to the work.

A tool embodying the invention is especially adapted for use in machines which are provided with a series of work-spindles, commonly known as multiple spindle machines. In such multiple spindle machines the articles produced from the different rods of stock held in the several work-spindles are liable to vary more or less in diameter as the result of the operation thereon of the tool or tools which are carried in a cross-slide, such variation being due to unavoidable inaccuracies in construction, or to inaccuracies in the indexing of the work-spindle turret, or to wear of the parts.

By the use of a sizing tool embodying the present invention in such a multiple spindle machine the articles produced from the different rods of stock held in the several work-spindles will all be turned or reduced to a uniform diameter, notwithstanding any variation in the positions of the several rods with relation to the tool which may exist as the work-spindle turret is indexed to bring the successive rods in position to be operated upon by said tool, and for the reason that the tool when brought into engagement with each successive rod will first automatically adjust itself with relation to said rod, and will then operate to turn or reduce said rod to the given diameter required, and so that the articles produced from the different rods will all be of a uniform diameter.

The invention consists in a metal-turning or sizing-tool embodying the features of construction hereinafter described and claimed.

Figure 2:
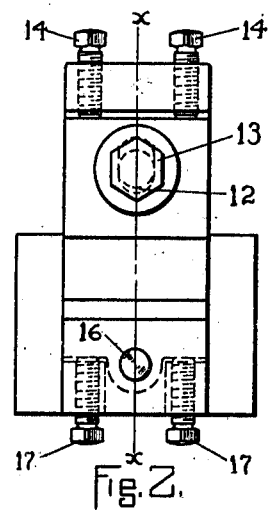
Figure 3:
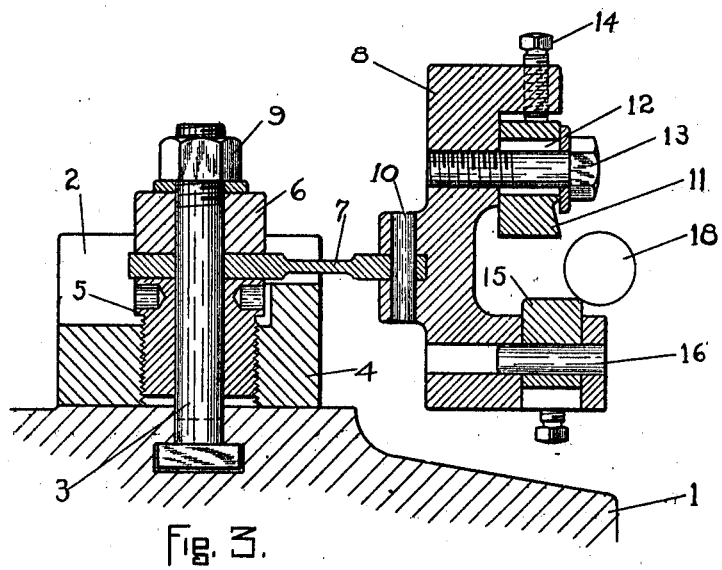

Referring to the drawings, Figure 1 shows in elevation a metal-turning tool embodying the invention, said tool being represented as mounted on a cross-slide; Fig. 2 is an end view of the same; and Fig. 3 is a section on the line $x, x$ of Fig. 2.

1 represents a portion of the cross-slide of a metal-working machine, as for example, a multiple spindle screw machine. 2 is the tool-carrier adjustably secured on said cross-slide by a clamp-bolt 3, the head of which takes into a T-slot formed in the cross-slide. As shown in the drawings, the tool-carrier 2 comprises a block 4 which rests upon the cross-slide, into which block is screwed a supporting post 5. Between the top of this post 5 and a clamping block 6 is clamped the shank 7 of the tool-holder 8. The clamp-bolt 3 passes through the post 5, the shank 7, and the clamp-block 6, and said shank is securely clamped and held in the tool-carrier by the nut 9 screwed upon the upper end of the clamp-bolt 3. The shank 7 projects outward from the tool-carrier, and to the outer end of said shank the tool-holder 8 is secured a pin 10, as shown in Fig. 3. In the upper part of the tool-holder is adjustably secured the tool 11. Said tool 11 is provided with an elongated slot 12 through which passes a clamp-screw 13 which takes into the body of the tool-holder. By loosening this clamp-screw the position of the tool in the tool-holder may be vertically adjusted. Two gage-screws 14, 14 are preferably employed, by the turning of which the position of the tool may be easily and accurately gaged.

Secured in the lower portion of the tool-holder is a back-rest 15. As shown in the drawings, said back-rest is mounted on a pin 16 and preferably two screws 17, 17, are employed, as shown in Fig. 2, by means of which screws the back-rest may be adjusted, if desired. As shown in Figs. 1 and 3, the back-rest 15 is located some distance in advance of the tool 11, and so that said back-rest will come in contact with the rod of stock 18 in advance of the tool, and as also shown in said figures, the shank 7 is for a greater or less portion of its length reduced in thickness or in its cross sectional area.

The operation of the turning or sizing-tool above described is as follows, it being understood that the tool 11 is adjusted in position so that the vertical distance between said tool and the back-rest corresponds to the diameter to which the rod or work is to be reduced. As the cross-slide advances the back-rest 15 will, by reason of its location in advance of the tool, first come in contact with the rod of stock. As now the cross-slide continues to advance, the advancing movement of the back-rest in engagement with the rod will, by the wedging action of said rod upon said back-rest, cause the tool-holder to be moved downward, such downward movement of the tool-holder being permitted by the springing of the shank 7, the springing of said shank being facilitated by its reduced cross sectional area for a portion of its length. During the advancing movement of the cross-slide the tool will have been brought into engagement with the rod, and as the cross-slide continues to advance, the diameter of the rod will be gradually reduced by the action of the tool thereon until finally the tool passes by the rod, the rod passing between the tool and back-rest, and the operation of reducing or sizing the rod being thus completed. During the operation of reducing the rod the spring force set up in the shank of the tool-holder will serve to keep the back-rest constantly in contact with the rod as the diameter of the rod is gradually reduced by the action of the tool thereon.

It will be seen that whatever may be the position of the rod of stock with relation to the tool within reasonable limits, when the back-rest comes in contact with said rod, the back-rest will, by its engagement with said rod in advance of the tool and by the springing of the shank 7, cause the tool to be brought into proper relation with said rod, or in other words, the tool as a whole will be caused to automatically adjust itself into proper relation with the rod of stock, whatever the position of said rod may be.

As will be further seen, the engagement of the back-rest with the rod of stock during the continued advancement of the cross-slide and the resulting springing of the shank 7 sets up a spring force in said shank which acts to keep the back-rest in constant contact with the rod as the diameter of the rod is gradually reduced. It will be further understood that the tool and back-rest together constitute a gage or caliper for gaging the reduced rod, and that said rod will be reduced to a diameter corresponding with the vertical distance between said tool and back-rest. Moreover, as the tool as a whole can, as above explained, automatically adjust itself with relation to the rod as the cross-slide advances, each successive rod will necessarily be reduced to the same diameter, even though the position of the successive rods with relation to the tool may vary more or less before the tool has been thus automatically adjusted.

What I claim as my invention and desire to secure by Letters Patent is:

1. A metal-turning tool adapted to be mounted on a cross-slide and comprising a tool-holder provided with a tool and a back-rest and having a spring-shank for attaching said tool-holder to said cross-slide.

2. A metal-turning tool adapted to be mounted on a cross-slide and comprising a tool-holder and a spring-shank for attaching said tool-holder to said cross-slide, said tool-holder being provided with a tool and a back-rest, said back-rest being located in advance of said tool.

3. The combination, with a cross-slide, of a tool-holder having a spring-shank by means of which said tool-holder is secured to said cross-slide, said tool-holder being provided with a tool and a back-rest.

4. The combination, with a cross-slide, of a tool-holder having a spring-shank by means of which said tool-holder is secured to said cross-slide, said tool-holder being provided with a tool and a back-rest, said back-rest being located in advance of said tool.

GEORGE H. NEWTON.

Witnesses:
W. H. THURSTON,
J. H. THURSTON.

---

Copies of this patent may be obtained for five cents each, by addressing the "Commissioner of Patents, Washington, D. C."